US011654617B2

(12) United States Patent
Xia et al.

(10) Patent No.: US 11,654,617 B2
(45) Date of Patent: May 23, 2023

(54) IMMERSION PROJECTION MICRO STEREOLITHOGRAPHY

(71) Applicant: BMF MATERIAL TECHNOLOGY INC., Guangdong (CN)

(72) Inventors: Chunguang Xia, San Diego, CA (US); Alexander Slocum, Bow, NH (US); John Kawola, Sudbury, MA (US); Jason Bassi, Newbury, NH (US)

(73) Assignee: BMF MATERIAL TECHNOLOGY INC., Guangdong (CN)

( * ) Notice: Subject to any disclaimer, the term of this patent is extended or adjusted under 35 U.S.C. 154(b) by 156 days.

(21) Appl. No.: 17/161,742

(22) Filed: Jan. 29, 2021

(65) Prior Publication Data
US 2021/0237345 A1     Aug. 5, 2021

Related U.S. Application Data

(60) Provisional application No. 62/991,691, filed on Mar. 19, 2020, provisional application No. 62/970,295, filed on Feb. 5, 2020.

(51) Int. Cl.
*B29C 64/124* (2017.01)
*B29C 64/209* (2017.01)
*B29C 64/245* (2017.01)
*B29C 64/232* (2017.01)
*B29C 64/286* (2017.01)
*B29C 64/393* (2017.01)
*B29C 64/364* (2017.01)
*B29C 64/236* (2017.01)
(Continued)

(52) U.S. Cl.
CPC .......... *B29C 64/124* (2017.08); *B29C 64/209* (2017.08); *B29C 64/232* (2017.08); *B29C 64/236* (2017.08); *B29C 64/245* (2017.08); *B29C 64/286* (2017.08); *B29C 64/364* (2017.08); *B29C 64/393* (2017.08); *B29C 64/129* (2017.08); *B33Y 10/00* (2014.12); *B33Y 50/02* (2014.12)

(58) Field of Classification Search
CPC ... B29C 64/124; B29C 64/129; B29C 64/232; B29C 64/245; B29C 64/209; B29C 64/393; B29C 64/236; B29C 64/286; B33Y 10/00; B33Y 50/02
USPC ............................................. 264/40.1, 308
See application file for complete search history.

(56) References Cited

U.S. PATENT DOCUMENTS

2018/0194064 A1* 7/2018 Chen ................. B33Y 50/02
2021/0331380 A1* 10/2021 Seo .................... B29C 64/129

* cited by examiner

*Primary Examiner* — Joseph S Del Sole
*Assistant Examiner* — Lawrence D. Hohenbrink, Jr.
(74) *Attorney, Agent, or Firm* — Dilworth IP, LLC

(57) ABSTRACT

A method for high resolution projection micro stereolithography for 3-D printing comprising: generating a 3D digital model of the sample to be printed in a computer, slicing the digital model into a sequence of images, wherein each of the images of the sequence represents a layer of the 3D digital model, positioning a transparent printing head relative to a resin vat containing a photo-sensitive resin, moving the transparent printing head into position for selectively exposing the photosensitive resin, sending an image from the sequence of images to a LCD or DLP chip, and together with a light source projecting the image through a lens onto the flat tip of the transparent printing head to initiate cure of the photosensitive resin in areas where the projected image allows light from the light source to reach the photosensitive resin.

16 Claims, 4 Drawing Sheets

(51) Int. Cl.
*B33Y 50/02* (2015.01)
*B33Y 10/00* (2015.01)
*B29C 64/129* (2017.01)

IMMERSION PROJECTION MICRO STEREOLITHOGRAPHY

The present invention provides improved methods for faster and larger-area printing without sacrificing the resolution available in existing projection micro stereolithography methods, for example, a 3D printing technology making use of an oxygen permeable membrane immersed in the photo-sensitive resin, in particular, a membrane moving in the resin stepwise during the large-area printing. The methods invented here are not limited to this 3D printing method, it is also valid for any other type of method using laser beam/spot scanning in 3D printing.

BACKGROUND

Stereolithography was originally conceived as a rapid prototyping technology. Rapid prototyping refers to a family of technologies that are used to create true-scale models of production components directly from computer aided design (CAD) in a rapid manner, i.e., faster than before. Since its disclosure in U.S. Pat. No. 4,575,330, stereolithography has greatly aided engineers in visualizing complex three-dimensional part geometries, detecting errors in prototype schematics, testing critical components, and verifying theoretical designs at relatively low costs, and in a faster time frame than before.

During the past decades, continuous investments in the field of micro-electro-mechanical systems (MEMS) have led to the emergence of micro-stereolithography (µSL) which inherits the basic principles from traditional stereolithography but with much higher spatial resolution e.g., K. Ikuta and K. Hirowatari, "Real three dimensional micro fabrication using stereo lithography and metal molding," 6th IEEE Workshop on Micro Electrical Mechanical Systems, 1993. Aided by single-photon polymerization and two-photon polymerization techniques, the resolution of µSL was further enhanced to be less than 200 nm, e.g., S. Maruo and K. Ikuta, "Three-dimensional microfabrication by use of single-photon-absorbed polymerization," Appl. Phys. Lett., vol. 76, 2000; S. Maruo and S. Kawata, "Two-Photon-Absorbed Near-Infrared Photopolymerization for Three-dimensional Microfabrication," J. MEMS, vol. 7, pp. 411, 1998; S. Kawata, H. B. Sun, T. Tanaka and K. Takada, "Finer features for functional microdevices," Nature, vol. 412, pp. 697, 2001.

The speed was dramatically increased with the invention of projection micro-stereolithography (PµSL), Bertsch et al., "Microstereophotolithography using a liquid crystal display as dynamic mask-generator", Microsystem Technologies, p 42-47, 1997; Beluze et al., "Microstereolithography: a new process to build complex 3D objects, Symposium on Design, Test and microfabrication of MEMs/MOEMs", Proceedings of SPIE, v3680, n2, p 808-817, 1999. The core of this technology is a high resolution spatial light modulator, which is either a liquid crystal display (LCD) panel or a digital light processing (DLP) panel, each of which are available from micro-display industries.

While PµSL technology has been successful in delivering fast fabrication speeds with good resolution, further improvements are still wanted.

As the display size of a DLP chip is currently limited to about 13 mm, when the projected pixel size is same as the physical pixel size (5 to 8 microns), the single exposure area is limited to half an inch. To print on a larger area with single projection, one needs to increase the size of the projected pixels, thus reducing the printing resolution (namely the size of the projected pixel).

There are three types of resin layer definition methods in PµSL: the first uses a free surface where the layer thickness is defined by the distance between the resin free surface and the sample stage. Due to the slow viscous motion of resins, when the printing area is larger than 1 cm×1 cm, it takes more than half an hour to define a 10 um thick resin layer with a viscosity of 50 cPs. The second and the third methods use either a transparent membrane or a hard window. Again, for both cases, there is currently no good method for defining 10 um or thinner resin layers over an area of 5 cm×5 cm or larger, especially for the membrane case, even if it is faster than the free surface case, it is still impractically slow. As for the hard window case, the fluidic dynamic force created when the sample and printing head, or two surfaces, close in to define the thin layer before exposure, or during the separation after exposure, is big enough to damage the samples.

In all 3D printing technologies, accuracy and efficiency in the dimensions replication is very important. For example, in immersion PµSL systems (FIG. 1), it is very important to have high accuracy and efficiency in dimension control for all layers, so that the actual CAD model can be duplicated in a practical period of time.

SUMMARY OF THE INVENTION

The present invention provides methods to more precise control, with greater speed, the layer thickness in a bigger printing area, for example, 10 cm×10 cm printing area with 10 um layer thickness. In one embodiment, the present method submerges the printing head in the photo-sensitive resin by few millimeters, in another embodiment the printing head is few hundred microns above the resin surface forming the resin meniscus. The printing head can be as big as one exposure of a full DLP chip or only cover part of the DLP chip. The methods not only greatly improve the dimensional accuracy of samples printed using, e.g., PµSL systems, but also significantly improve the printing speed by eliminating the need of closure or separation of two contact surfaces in resin.

In one embodiment of the invention, the printing head is covered and sealed by a nonstick transparent membrane or hard window at the tip. In some embodiments the membrane/hard window can comprise gas permeable materials, particularly oxygen permeable materials, for example, Polydimethylsiloxane (PDMS) or Dupont™ Teflon® AF polytetrafluoroethylene.

In one embodiment, the printing head can have an ultrasound source of over 10 kHz frequencies to increase the flow speed of the resin during its movement when contacting with the resins. In another embodiment, the printing head can have a pressure control to compensate the deformation of the membrane or hard window due to the contact with the printing resin, the pressure controlled gas can be the one that prevents the sample from sticking to the membrane or hard window during polymerization, such as oxygen or its mixture.

For example, in many embodiments, the invention makes use of a system comprising: i) a LCD or DLP micro display chip together with a light source displaying digital images from the computer, ii) a lens having an optical axis, iii) a printing head with a sealed, optically transparent, and gas permeable flat tip, iv) a charge-coupled device (CCD) capable of monitoring the projection on the printing head, and v) three precision stages to control the motion of the sample substrate in X, Y, and Z directions. The system is arranged relative to a surface of a substrate so that the lens is situated between the surface of the substrate and the CCD and is gravitationally above the substrate, the optical axis of the lens intersects the surface, and the CCD is focusable through the lens along the optical axis.

In one embodiment, with the aid from XY stages, the immersion PµSL provides three printing modes. When one only needs a single sample, which is smaller than the single exposure size, it is called single exposure mode. If multiple samples are needed, the XY states will move stepwise and print the same sample in an array, which is called array exposure mode. As the sample size increases to exceed the size of the single exposure, the system will further divide one layer into multiple sections and stitch the adjacent sections into a whole layer by overlapping 5 um to 20 um on the shared edges. This is the stitching exposure mode. It is also possible to combine the stitching mode with array mode.

In one embodiment of the invention, the interpolated offset error curves based on the measured data from actual samples will be fed into the translation of the XY stages to compensate the mechanical tolerances to ensure the accuracy of the stitching-printed sample is within the specifications.

In one embodiment, the printing head is submerged in the resin from 1 to 10 millimeters. As one exposure is finished and the printing head moves into the new area, the hard edge of the tip serves as a resin coating scraper. The coating thickness is defined by the gap between the flat tip of the printing head and the top layer of the sample. As the printing head moves to the adjacent area, the resin behind the printing head is driven by the gravity and surface tension to flow and cover the previous exposed area. After the whole layer is printed, the printing head will move outside the sample boundary before the sample stage moves down the thickness of a layer to define the next layer of fresh resin. After a new layer defined, the printing head will move in and start to scan and print the next layer stepwise. In many embodiments herein, the sample is shown moving in XYZ directions, but in some embodiments good results are obtained by moving the printing head while keeping the sample stationary.

In another embodiment, the printing head together with the top layer of the sample is 100 to 500 microns above the resin level. In this printing head configuration, as one layer is finished, the sample together with the substrate will be submerged 2 mm to 8 mm into the resin to let the fresh resin cover the top surface of the sample. Then the sample will move back up to the printing head height with a gap equal to the thickness of the next layer. Again, the printing head will move in from outside of the sample, scrape, coat, and expose the new layer stepwise.

DISCUSSION OF THE INVENTION

Figure 2:
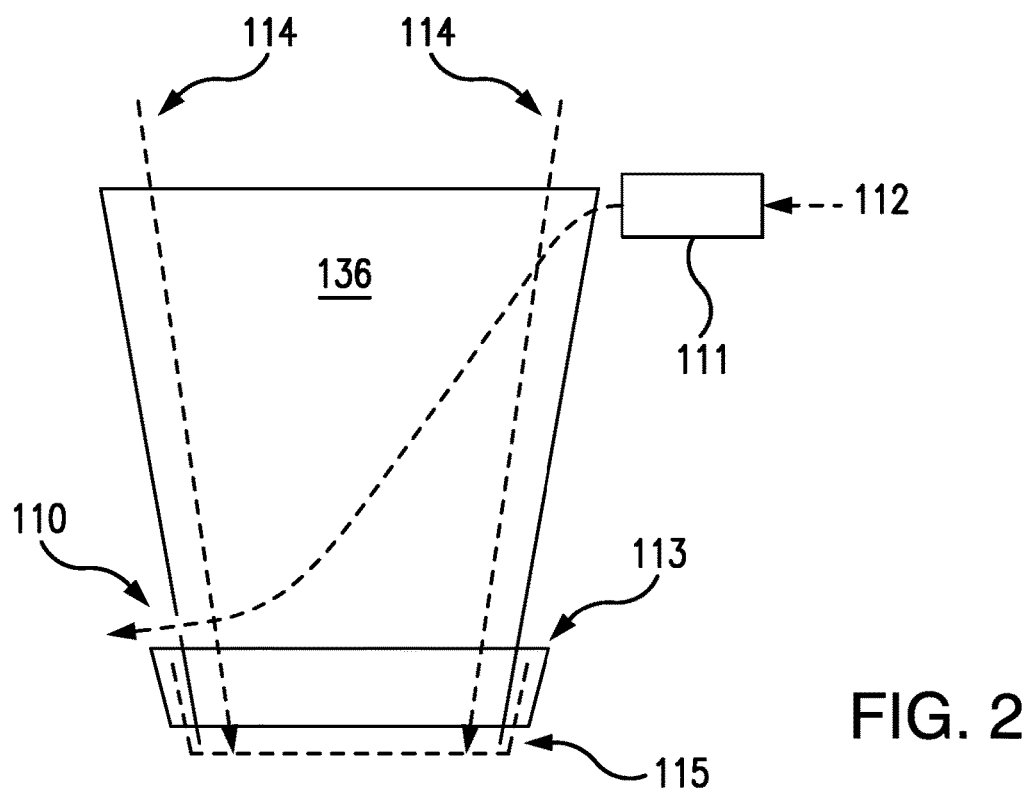
FIG. 2 is a schematic drawing of a printing head in an immersion PµSL system.

In one embodiment of the invention, the method is aided by a nonstick printing head as in FIG. 2, e.g., as part of the lens/CCD device/displacement system discussed above. Typically, the size of the transparent window of the printing head is to cover a single DLP/LCD chip projection. For example, the projection of 17 mm chip is 20 mm with 10 um pixel resolution, and then the diameter of the window can be around 22 mm. In this particular embodiment, the transparent window at the tip of the printing head is a membrane of Du Pont™ Teflon® AF polytetrafluoroethylene of 130 um thick, which is gas permeable and has superior optical clarity. The gas permeability, especially oxygen permeability, makes the film nonstick during photo polymerization, as oxygen is a photo-crosslinking inhibitor. In other embodiments, a Polydimethylsiloxane (PDMS) membrane or a surface coated hard window can also be used for the same purpose. As the printing head can be submerged into the resin, the tip of the head is sealed to liquid tight by a locking ring 113. The deflection at the center of the membrane in the resin due to the hydraulic pressure is described by the following equation assuming the linear elasticity for the membrane:

$$\frac{3(1-\upsilon^2)}{16}\left(\frac{pa^4}{Eh^3}\right)$$

Where $\upsilon$ is the Poisson ratio of the membrane, $\alpha$ is the radius of the circular membrane tip, E is the Young's modulus, h is the thickness, and p is the pressure difference on both sides of the membrane. It shows the deformation of the tip is proportional to the pressure difference; therefore, it is possible to eliminate the deflection of the membrane by controlling the pressure 136 in the printing head and thus the pressure difference on both sides. The liquid pressure on the wet surface of the window can be calculated by $p=\rho gh$, where $\rho$ is the density of the resin, g is the gravity acceleration, h is the depth in the resin from the free surface. Therefore, the pressure inside the printing head should be controlled to compensate the liquid pressure. Such that to eliminate the deformation of the membrane window. The combination of a mass flow controller (MFC) 111, a downstream flow restrictor 110 and a pressure transducer on the printing head will control the pressure 136 in the printing head. The thickness of the nonstick, oxygen inhibition layer can be improved by increasing the concentration of oxygen in the printing head; hence a flow of various oxygen concentration mixtures can be used by the MFC 111 to control the pressure.

Figure 3:
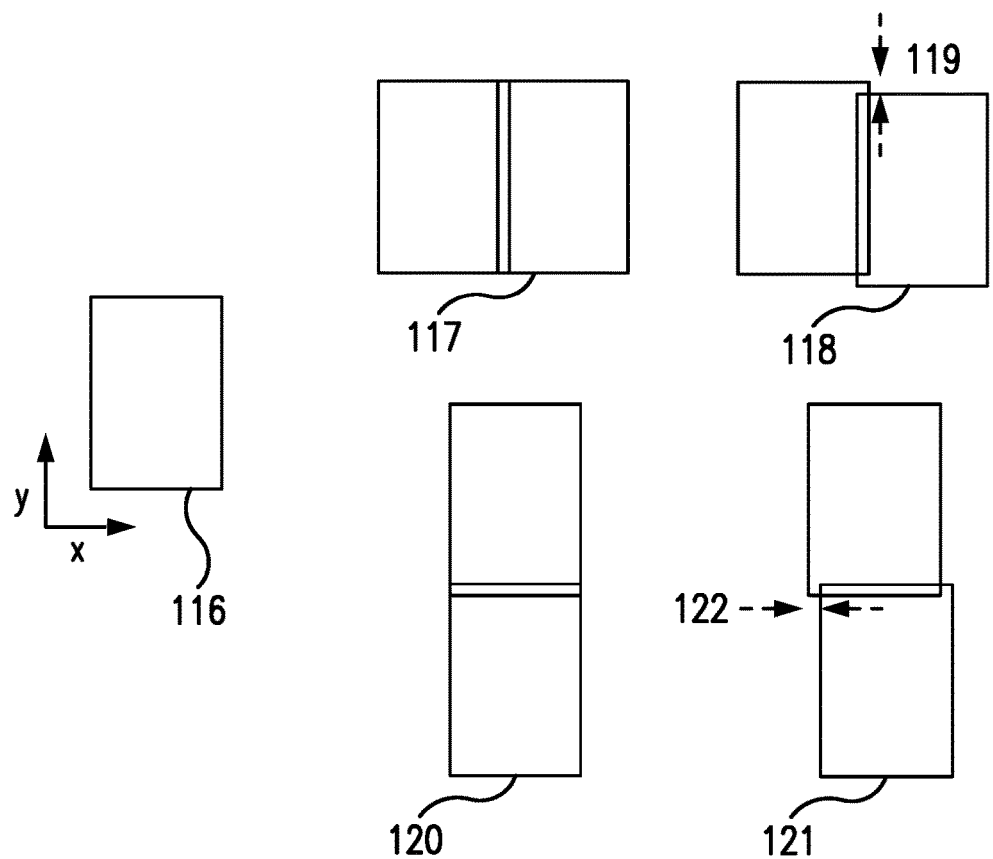
FIG. 3 tells the stitching errors in x and y direction during the stitch printing in an immersion PµSL system.

The printing process starts by generating a 3D model in the computer and then slices the digital model into a sequence of images, with each image represents a layer (5 to 20 micrometers) of the model. The control computer sends the image to the micro display chip and projects the image through the lens onto the bottom surface (the wet surface) of the printing tip. The bright areas are polymerized whereas the dark areas remain liquid. Due to the size limit of either LCD or DLP chip, for example a DLP chip with 1920×1080 pixels at 10 um printing optical resolution, a single exposure only covers area of 19.2 mm×10.8 mm. Therefore, if the cross-section of a sample is larger than 19.2 mm×10.8 mm, it cannot be printed with single exposure method. In this invention, a multiple-exposure stitching printing method is proposed. By this method, the image representing a layer of the 3D model is further divided into multiple smaller images with each image no larger than the DLP pixel resolution. For instance, an image of pixel resolution of 3800×2000 can be divided into four 1900×1000 sub-images with each one representing a quarter of this layer. As a result, a full layer of the model will be printed section by section based on the sub-images. To improve the mechanical strength of the shared edges of the adjacent sections there is typically about a 5-20 microns overlap on the edges. The precise position and the amount of overlap are accurately controlled by the XY stage assembly. There are two coordinate systems: one is aligned with the DLP/LCD panel, the other one is the XY stage assembly. When these two coordinate systems are not parallel due to the assembly tolerance, there will be offset errors on the shared edges of adjacent sections. As shown in FIG. 3, 116 is the size of a single exposure; 117 is the result of precise alignment on x direction; 118 is the result with error offset on x direction 119; 120 is the result of precise alignment on y direction; 121 is the result with error offset on y direction 122. In the precision printing with error requirement less than 10 um, stage assembly tolerance is usually off the allowed range; and the offset is not linear to the stage travel distance. Therefore, in this invention, we measure the offsets at over 5 evenly distributed points on both x and y directions on the full-range printed square sample. The at least second order polynomial interpolated offset error curves will be fed into the translation of the XY stages to compensate the offset thus ensure the accuracy of the stitching-printed sample is within the specifications.

Figure 4:
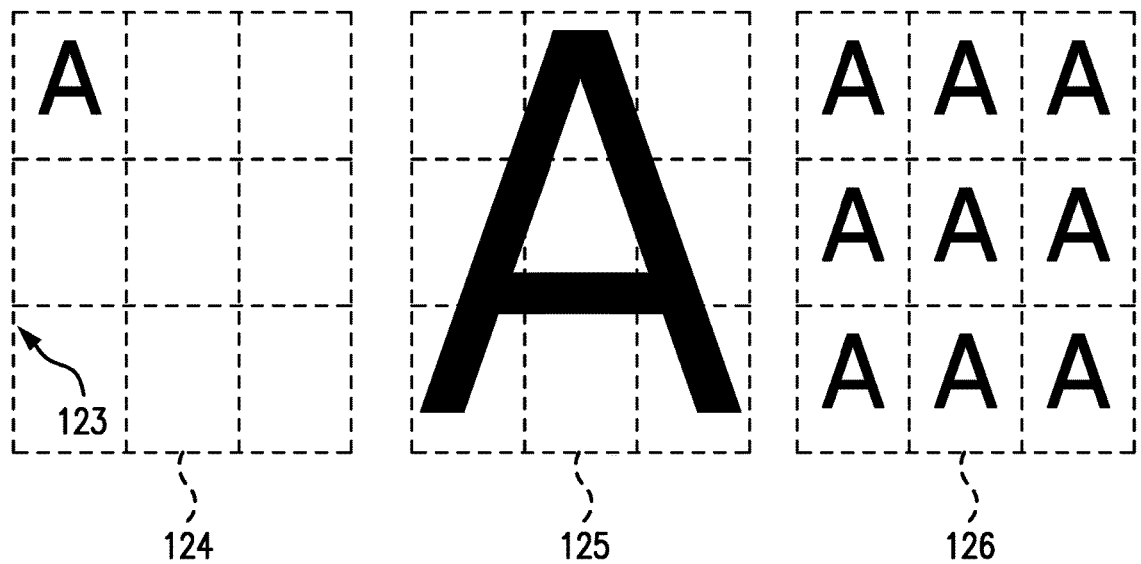
FIG. 4 shows the three printing modes in an immersion PµSL system.

With the aid from XY stages, the immersion PμSL provides basically three printing modes (FIG. 4). When printing a single sample that is smaller than a single exposure size 124, the x, y stages do not move during printing. It is called single exposure mode. If multiple identical samples are needed, the XY states will move stepwise and print the same sample in an array. And this is called array exposure mode 126 which is much faster for small volume production than repeating the single exposure mode. As the sample size increases to exceed the size of the single exposure, the system will further divide one layer into multiple sections and stitch the adjacent sections into a whole layer by overlapping 5um to 20 um on the shared edges. This is the stitching exposure mode 125. It is possible to combine the stitching mode 125 with array mode 126 when one needs multiple identical samples but needs stitching exposure 125 as the sample is larger than single exposure. However, this case is usually treated as stitching exposure mode 125.

Figure 5:
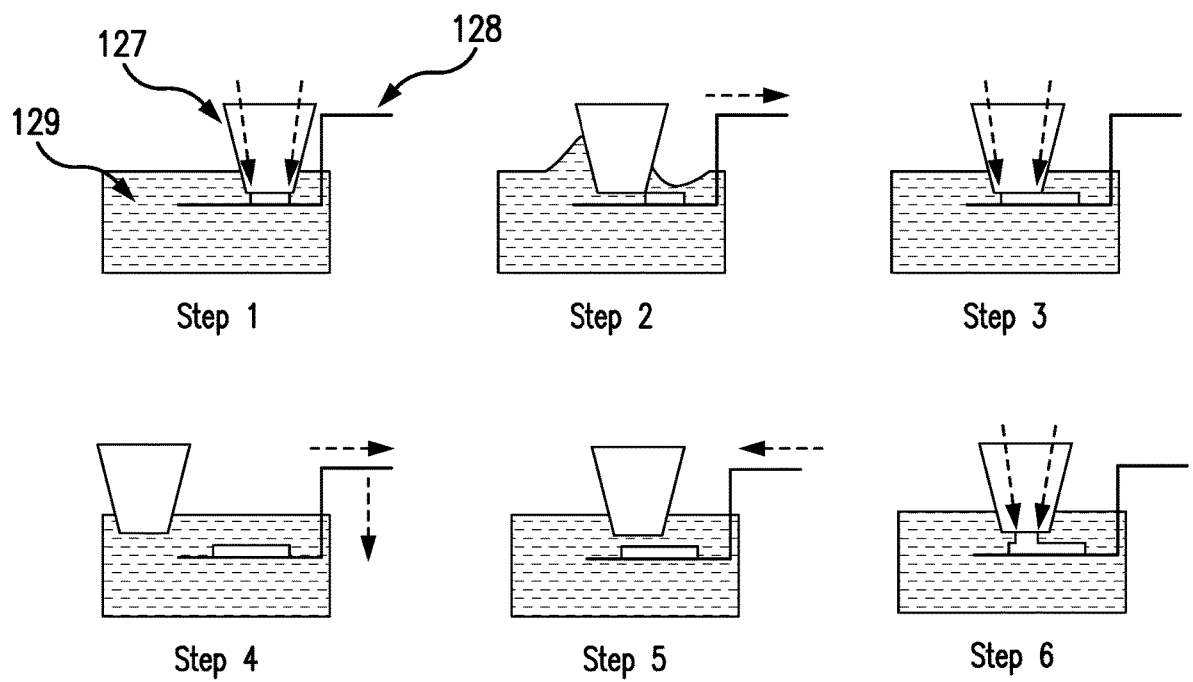
FIG. 5 shows steps for the submersion printing operation with the printing head above the substrate in an immersion PµSL system.

In one embodiment, the printing head is on top pf the substrate and is submerged in the resin by from 1 to 10 millimeters [FIG. 5]. The submersion depth depends on the viscosity of the resin; a thinner resin will need shallower submersion. The lens projects the images from the LCD or DLP chip to the lower surface (the wet surface) of the transparent printing head 127. As one exposure is finished, XY stages move in the stitching and array exposure printing modes will move the printing head to the adjacent area for next exposure but with around 5-20 microns overlap on the shared edge to fuse the adjacent sections together. As the printing head 127 moves into the new area, the hard edge of the tip serves as a resin coating scraper. The coating thickness is defined by the gap between the flat tip of the printing head 127 and the top layer of the sample. As the printing head 127 moves to the adjacent area, the resin behind the printing head 127 is driven by the gravity and surface tension to flow and cover the previous exposed area. After the whole layer is printed, the printing head 127 will move outside the sample boundary before the sample stage moves down a layer thickness to define the next layer of fresh resin. By moving the printing head 127 outside the sample boundary, the interaction force between the printing head 127 and the sample is only the fluid shear force. This force is much smaller than the perpendicular or normal separation of two surfaces in resin which is typical in existing PμSL. As shown in the following equation:

$$\sigma = -pI + 2\mu\varepsilon$$

Here σ is the fluid stress tensor, p is the pressure, I is the identify tensor, μ is the fluid viscosity and ε is velocity gradient tensor (or fluid strain tensor). For two almost contact surfaces to separate normally in resin with viscosity of 50 cPs at speed of 10 mm/s, the vacuum effect is at order of $1e^5$ Pas. But if the two surfaces slice against each other at 20 um gap, the force is at order of $1e^2$ Pas. Therefore, this method dramatically reduces the possibility of damaging the sample. After the new layer is defined, the printing head will move in and start to scan and print the next layer stepwise. In this invention, we present the configuration of moving the sample in XYZ directions, but in some embodiments, one can instead move the printing head with the sample keep stationary.

Figure 6:
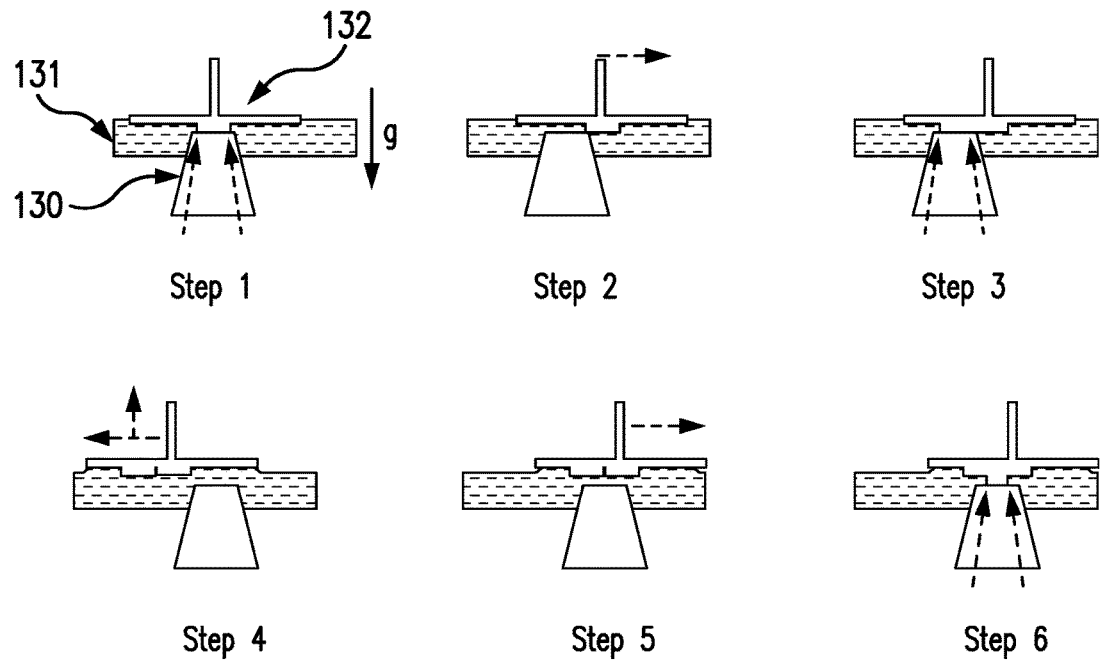
FIG. 6 shows steps for the submersion printing operation with the substrate above the printing head an immersion PµSL system.

In another embodiment, the printing head can be gravitationally reversed as in FIG. 6. The transparent window is 0.5 mm to 2 mm under the free surface of the resin. The substrate is on top and moves in XYZ directions to define layers and stitch layer sections as stated above. In this configuration, the printed part is not soaked in the resin during the printing which can last tens of hours and this can be desired to some of the hydrogel resins. As long time soaking in the resin can cause swelling of the printed parts leading to dimensional error.

As the viscosity of the resin increases, it will take longer and longer time for the resin to flow and cover the printed area. In one embodiment, an ultrasound source with frequency larger than 10 kHz can be introduced to the printing head 130 to increase the resin flow speed; Or in another embodiment, the printing head 134 together with the top layer of the sample is elevated to 100 to 500 microns above the resin level [FIG. 7]; again the height depends on the viscosity of the resin. In this meniscus printing head 134 configuration, the steps of printing the whole layer are the same as the ones stated above, but as one layer is finished, the sample together with the substrate will be submerged 2 mm to 8 mm into the resin to let the fresh resin cover the top surface of the sample. Then the sample will move back up to the printing head 134 height with a gap equal to the thickness of the next layer. Again, the printing head 134 will move in from outside of the sample, scrape, coat, and expose the new layer stepwise. By doing this the printing head pushes the extra resin back to the vat.

GENERAL EMBODIMENTS

The invention provides a method for high resolution, projection micro stereolithography for 3-D printing of a sample, object item etc., wherein one or more coating layers, typically multiple coating layers, are printed over a larger area and at faster speeds than presently available, the method comprises:

generating a 3D digital model of the sample or object to be printed in a computer, and then slicing the digital model into a sequence of images wherein each of the images of the sequence represents a layer of the 3D digital model, so that after each layer is applied the sample or object has been formed.

In the present method, a transparent printing head comprising a flat tip at one surface is positioned relative to a resin vat containing a photo-sensitive resin and a substrate for holding the sample during printing, e.g., a sample holder, wherein the flat tip is in contact with the photo-sensitive resin, the transparent printing head is moved into position for selectively exposing the photosensitive resin, during this movement an edge of the flat tip scrapes resin away so that the coating thickness is defined by the gap between the flat tip of the printing head and a top layer of the sample, or between the flat tip of the printing head and the substrate for holding if no previous coating has been applied.

Once the printing head is positioned, an image from the sequence of images is sent to a LCD or DLP chip, which is, together with a light source, projected through a lens onto the flat tip of the transparent printing head, and to initiate cure of the photosensitive resin in areas where the projected image allows light from the light source to reach the photosensitive resin. The sample substrate and/or printing head are then moved to continuing printing when the image is larger than the size of single exposure or if a subsequent coating layer is to be applied.

The sample substrate and/or printing head are moved by X, Y, Z or X, Y stages, i.e., high precision, positioning devices, which will position the substrate and/or printing head in new areas or depths. Interpolated offset error curves based on measured data from samples can be fed into the translation of the XY stages to compensate errors due to mechanical tolerances.

In many embodiments, the printing head is covered and sealed by a nonstick transparent, gas permeable membrane or hard window at the flat tip, which prevents deformation due to the head sticking to the layer, or buildup at the tip due to premature curing of resin, e.g., oxygen can inhibit radical chain reactions. Deformation can also occur by air/gas pressure deforming the printing head. Thus, pressure in the printing head is controlled to compensate for deformation of the membrane or hard window due to contact with the printing resin, typically by introducing controlled amounts of gas such as oxygen.

In one particular embodiment, the digital image from the computer is projected by the LCD or DLP micro display chip together with alight source through a lens onto a printing head with a sealed, optically transparent, and gas permeable flat tip, wherein the lens has an optical axis intersecting the sample substrate, which lens is gravitationally above the sample substrate and situated between a surface of the sample substrate and charge coupled device, which charge coupled device is capable of monitoring the projections onto the printing head and is focusable through the lens along the optical axis wherein the motion and position of the sample substrate in X, Y, and Z directions is controlled by three precision stages.

Figure 1:
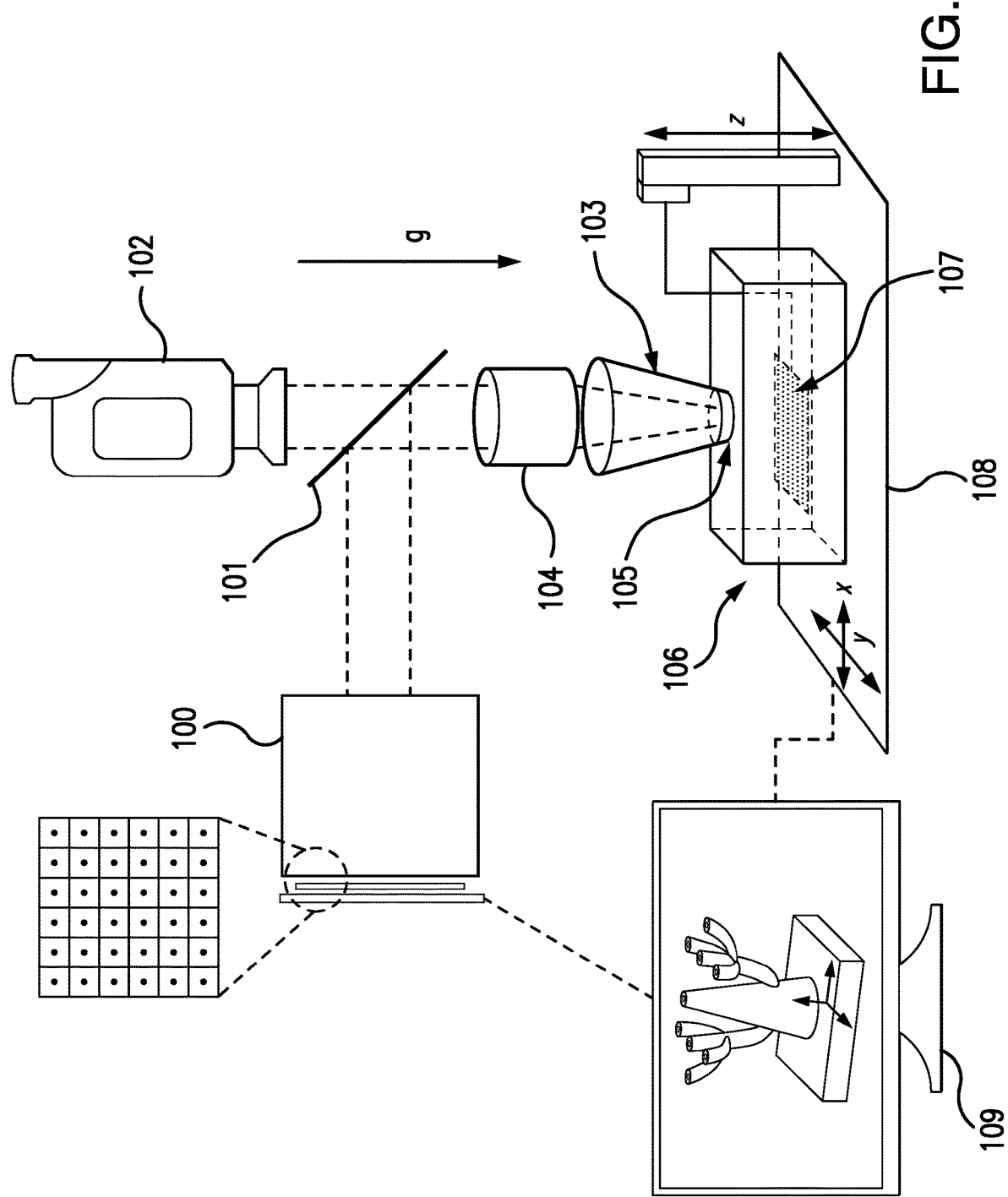
FIG. 1 is a schematic drawing of an immersion PµSL system.
Figure 7:
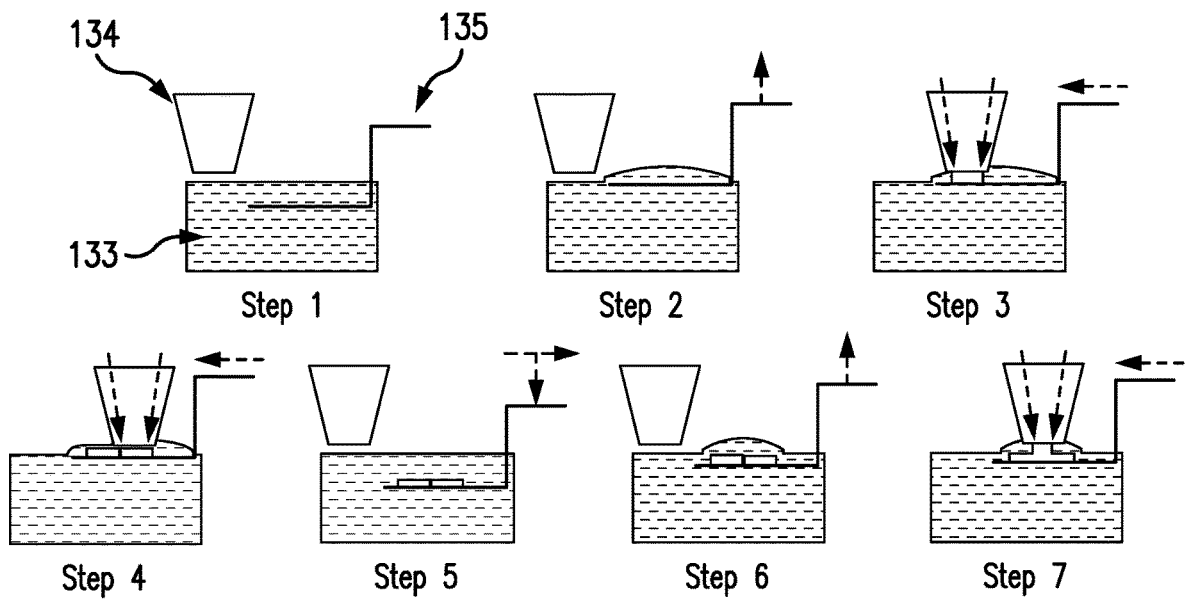
FIG. 7 shows steps for the meniscus printing operation in an immersion PµSL system.

Referring now to FIG. 1, it shows a schematic drawing of an immersion PμSL system, including a digital light processing panel (DLP) and light source 100, beam splitter 101, charge coupled device (CCD) 102, print head 103, projection lens 104, nonstick window 105, resin vat 106, sample substrate 107, xyz stage assembly 108, and video unit 109. Referring now to FIG. 2, it shows a schematic drawing of the printing head in an immersion PμSL system, including image projection 114, oxygen mixture 112, mass flow controller (MFC) 111, pressure in the printer head 136, a downstream flow restrictor 110, locking ring 113, and gas permeable membrane 115. Referring now to FIG. 3, it shows a representation of stitching error in the x and y directions during stitch printing in an immersion PμSL system, including the size of a single exposure 116, the result of precise alignment on x direction 117; 118 is the result with error offset on the x direction 119, the result of precise alignment on the y direction 120, and 121 is the result with error offset on the y direction 122. Referring now to FIG. 4, it shows three exposure modes in an immersion PμSL system, including single exposure 124 having printing boarders 123, stitching exposure 125, and array exposure 126. Referring now to FIG. 5, shown are the steps (1-6) for a submersion printing operation with the printing head above the substrate in an immersion PμSL system including printing head 127, substrate arm 128 and resin vat 129. Referring now to FIG. 6, it shows steps (1-6) for a submersion printing operation including the substrate above the printing head in an immersion PμSL system, with printing head 130, resin vat 131 and substrate 132. Referring now to FIG. 7, it shows steps (1-7) for a meniscus printing operation in an immersion PμSL system, including resin vat 133, printing head 134 and substrate arm 135.

What is claimed:

1. A method for high resolution projection micro stereolithography for 3-D printing of a sample, the method comprising:

generating a 3D digital model, of a sample to be printed, in a computer, and then slicing the digital model into a sequence of images, wherein each of the images of the sequence represents a layer of the 3D digital model;

positioning a transparent printing head relative to a resin vat containing a photosensitive resin and a substrate for holding the sample during printing, wherein:
  a surface of the printing head comprises a flat tip that is in contact with the photo-sensitive resin,
  the printing head is covered and sealed by a nonstick, transparent, gas permeable membrane or hard window at the flat tip, and
  a pressure in the printing head is controlled to compensate for deformation of the membrane or hard window due to contact with the photosensitive resin;

moving the printing head into position for selectively exposing the photosensitive resin, wherein an edge of the flat tip serves as a resin coating scraper by moving excess resin so that a coating layer of resin on the sample has a thickness defined by a gap between the flat tip of the printing head and either a most recently printed layer of the sample or the substrate for holding the sample, whichever is closer to the flat tip;

sending an image of the sequence of images to an LCD or DLP chip, and together with a light source projecting the image through a lens onto the flat tip of the printing head to initiate curing of the photosensitive resin in areas where the projected image allows light from the light source to reach the photosensitive resin;

moving the substrate and/or printing head to continue printing of the image when the image is larger than the size of a single exposure area or to print a subsequent image of the sequence of images.

2. The method according to claim 1 wherein three precision stages control the moving of the substrate and/or printing head in X, Y, and Z directions.

3. The method according to claim 1 wherein one or more precision stages control the moving of the substrate and/or printing head in at least X and Y directions.

4. The method according to claim 1 wherein the membrane or hard window comprises oxygen permeable materials.

5. The method according to claim 4 wherein the membrane or hard window comprises polydimethylsiloxane or Dupont™ Teflon® AF polytetrafluoroethylene.

6. The method according to claim 1 wherein as one exposure is finished, XY stages in stitching and array exposure printing modes move the printing head to an adjacent exposure area for a next exposure, wherein as the printing head moves into the adjacent exposure area, the edge of the flat tip scrapes excess resin so that a following coating layer has a thickness defined by the gap between the flat tip of the printing head and either a most recently printed layer of the sample, or the substrate for holding the sample, whichever is closer to the flat tip.

7. The method according to claim 6 wherein an overlap of 5-20 microns is maintained on a shared edge between the exposure area where the exposure has finished and the adjacent exposure area to fuse these areas together.

8. The method according to claim 7 wherein interpolated offset error curves based on measured data from previously printed samples are fed into the translation of the XY stages to compensate for mechanical tolerances of the XY stages.

9. The method according to claim 5 wherein the printing head is submerged in the photosensitive resin by 1 to 10 millimeters.

10. The method according to claim 1 wherein the printing head together with the is elevated so that a bottom of the printing head is 100 to 500 microns gravitationally above a free surface level of photosensitive resin within the resin vat, with the printing head forming a photosensitive resin meniscus by being in contact with the photosensitive resin.

11. The method according to claim 1 wherein an ultrasound source with a frequency greater than 10 kHz is incorporated into the printing head to increase a flow speed of the photosensitive resin.

12. The method according to claim 1 where in the pressure the printing head is controlled by controlling a pressure of a gas introduced into the printing head.

13. The method according to claim 12 wherein the gas introduced into the printing head comprises oxygen.

14. The method according to claim 12 wherein:
the lens has an optical axis intersecting the substrate;
the lens is situated between a surface of the substrate and charge coupled device; and
the charge coupled device is capable of monitoring the projecting of the image onto the printing head; wherein the projected image is focusable through the lens along the optical axis; and
the moving of the printing head and the moving of the sample in X, Y, and Z directions is controlled by three precision stages.

15. The method according to claim 1 wherein the printing head is gravitationally above the substrate.

16. The method according to claim 1 wherein the substrate is gravitationally above the printing head.

* * * * *